(12) United States Patent
Hwang

(10) Patent No.: US 8,473,985 B2
(45) Date of Patent: Jun. 25, 2013

(54) MOBILE TERMINAL AND METHOD OF MANAGING BROADCASTING SERVICE INFORMATION USING DIGITAL BROADCAST RECEPTION FUNCTION

(75) Inventor: Jae Moon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 329 days.

(21) Appl. No.: 11/692,506

(22) Filed: Mar. 28, 2007

(65) Prior Publication Data

US 2007/0261078 A1   Nov. 8, 2007

(30) Foreign Application Priority Data

Mar. 30, 2006   (KR) .................. 10-2006-0028974

(51) Int. Cl.
*H04N 7/025* (2006.01)
(52) U.S. Cl.
USPC ............................................. 725/48; 725/49
(58) Field of Classification Search
USPC .................................................... 725/48–49
See application file for complete search history.

(56) References Cited

U.S. PATENT DOCUMENTS

| | | | |
|---|---|---|---|
| 6,037,998 A | 3/2000 | Usui et al. | |
| 6,828,993 B1* | 12/2004 | Hendricks et al. | 725/49 |
| 2002/0057367 A1 | 5/2002 | Baldock | |
| 2003/0028549 A1 | 2/2003 | Hartel et al. | |
| 2003/0051246 A1* | 3/2003 | Wilder et al. | 725/49 |
| 2003/0067943 A1 | 4/2003 | Arsenault et al. | |
| 2006/0026662 A1 | 2/2006 | Shield et al. | |
| 2006/0127032 A1* | 6/2006 | van Rooyen | 386/37 |
| 2006/0161953 A1* | 7/2006 | Walter et al. | 725/48 |

FOREIGN PATENT DOCUMENTS

| | | |
|---|---|---|
| EP | 1041757 | 10/2000 |
| GB | 2405018 | 2/2005 |
| JP | 2004-538725 | 12/2004 |
| JP | 2005-521309 | 7/2005 |
| JP | 2006-054867 | 2/2006 |
| KR | 10-2004-0034891 | 4/2004 |
| WO | 99/49602 | 9/1999 |
| WO | 02054769 | 7/2002 |
| WO | 2004051988 | 6/2004 |

\* cited by examiner

*Primary Examiner* — Scott Beliveau
*Assistant Examiner* — Michael Telan
(74) *Attorney, Agent, or Firm* — Lee, Hong, Degerman, Kang & Waimey

(57) ABSTRACT

A mobile terminal having a digital broadcast reception function is provided. The mobile terminal includes a digital broadcast reception unit receiving one or more digital broadcasting service information having different broadcasting modes via different paths; a memory storing the digital broadcasting service information received via the digital broadcast reception unit and a metadata interface for mapping the digital broadcasting service information according to semantics; a control unit extracting the digital broadcasting service information from the memory using the metadata interface and generating a control signal for displaying the extracted result in a form that can be recognized by a user; and a display unit displaying the extracted result according to the control signal from the control unit.

10 Claims, 2 Drawing Sheets

MOBILE TERMINAL AND METHOD OF MANAGING BROADCASTING SERVICE INFORMATION USING DIGITAL BROADCAST RECEPTION FUNCTION

CROSS-REFERENCE TO RELATED APPLICATIONS

Pursuant to 35 U.S.C. §119(a), this application claims the benefit of earlier filing date and right of priority to Korean Application No. 10-2006-0028974, filed on Mar. 30, 2006, the contents of which is incorporated by reference herein in its entirety.

FIELD OF THE INVENTION

The present invention is directed to a mobile terminal, and more particularly, to a mobile terminal and a method of managing broadcasting service information using a digital broadcast reception function that is capable of integrating and searching electronic program guides.

DESCRIPTION OF THE RELATED ART

Broadcasting program schedule information is necessary in order to view digital broadcasting programs as representative digital multimedia contents. For example, digital broadcasting service information called an electronic program guide (EPG) is necessary.

The EPG is service information (SI) indicates a channel, a schedule and a title of broadcast data. The EPG in the prior art includes a broadcasting service mode that varies depending on a broadcaster and the type of broadcast. A prior art method of providing the EPG varies according to an EPG process and a representation engine of a broadcasting terminal. Accordingly, there is a limitation in using EPG information having different broadcasting modes.

The structure of the EPG information varies depending on a broadcaster and a broadcasting service. For example, while the EPG information is transmitted over a network of a mobile communication service provider without a channel in terrestrial digital multimedia broadcasting (TDMB), the EPG information is transmitted via a broadcasting channel in satellite digital multimedia broadcasting (SDMB). Currently, a different receiver is necessary for each broadcasting mode and a terminal for supporting a variety of broadcasting modes is being developed.

Demultiplexers filter broadcasting signal streams output from a plurality of tuners/demodulators according to a section. Subsequently, the demultiplexers extract Si information.

Controllers parse a table in the same method and establish an integrated EPG database that is stored in a memory. The integrated EPG database is provided to a user as an on screen display (OSD) signal. The existing method of storing the EPG according to the broadcaster and the broadcasting mode in the integrated database requires a change in the structure of the EPG data provided by the broadcaster in order to integrate and store EPG data having different structures.

Currently, an EPG suitable for a broadcasting service environment for the broadcaster is provided. A mobile terminal can provide a single EPG usage environment corresponding to a broadcasting system, but must change the storage structure of the EPG data in order to store EPG data having different structures in the integrated database. Accordingly, since the integrated EPG database includes data having a changed structure, it is difficult to conform to a new broadcasting environment standard when metadata, or semantics of the EPG data, is changed.

SUMMARY OF THE INVENTION

An object of the present invention is to provide a mobile terminal and a method of managing broadcasting program information that are capable of integrating, storing and searching a variety of broadcasting program schedule information without changing their modes. Another object of the present invention is to provide a mobile terminal and a method of managing broadcasting program information that are capable of easily using broadcasting program schedule information having different structures as single information. Another object of the present invention is to provide a mobile terminal and a method of managing broadcasting program information that are capable of easily corresponding to a new broadcasting environment standard.

In one aspect of the present invention, a method of managing digital broadcasting service information in a mobile terminal is provided. The method includes storing a plurality of first information corresponding to at least one digital broadcasting service having a plurality of different broadcasting modes, each of the plurality of first information having a structure corresponding to one of the plurality of broadcasting modes and stored without any conversion, storing second information indicating data related to mapping meta-structure information of each of the plurality of first information, receiving a request to view a specific one of the at least one digital broadcasting service and outputting one of the plurality of first information corresponding to the requested specific digital broadcasting service, the first information output by utilizing the second information such that the first information is displayed in a form recognizable by a user.

It is contemplated that the plurality of first information includes an electronic program guide (EPG). It is further contemplated that outputting one of the plurality of first information includes displaying a single virtual table.

It is contemplated that outputting one of the plurality of first information includes generating an audible signal. It is further contemplated that the method further includes receiving at least two digital broadcasting signals including the contents of the requested specific digital broadcasting service, each of the at least two digital broadcasting signals corresponding to one of the plurality of different broadcasting modes, comparing reception levels of the at least two digital broadcasting signals and setting a reception mode to a broadcasting mode of one of the at least two digital broadcasting signals according to the result of the comparison.

It is contemplated that setting the reception mode includes determining the one of the at least two digital broadcasting signals having the highest reception level. It is further contemplated that the reception mode is automatically set.

It is contemplated that the first information stored in the memory includes at least one of terrestrial digital multimedia broadcasting, satellite digital multimedia broadcasting, media flow, and digital video broadcasting-handheld (DVB-H) digital broadcasting. It is further contemplated that the second information is received over at least one of a mobile network, a wireless Internet, and a broadcasting network. Preferably, the first information is digital broadcasting service information and the second information is a metadata interface.

In another aspect of the present invention, a mobile terminal having a digital broadcast reception function is provided. The mobile terminal includes a digital broadcast reception unit configured to receive a plurality of first information corresponding to at least one digital broadcasting service having a plurality of different broadcasting modes, each of the plurality of first information having a structure corresponding to one of the plurality of broadcasting modes, a memory configured to store the first information and second information, the second information indicating data related to mapping meta-structure information of each of the plurality of first information, a display unit configured to convey information to a user and a control unit configured to store the plurality of first information in the memory unit without any conversion, output one of the plurality of first information corresponding to a specific one of the at least one digital broadcasting service requested by the user, the first information output by utilizing the second information, and control the display unit such that the first information is displayed in a form recognizable by the user.

It is contemplated that the plurality of first information includes an electronic program guide (EPG). It is further contemplated that the control unit is further configured to control the display unit such that the first information is displayed as a single virtual table.

It is contemplated that the control unit is further configured to generate an audible signal when outputting one of the plurality of first information. It is further contemplated that when at least two digital broadcasting signals including the contents of the requested specific digital broadcasting service are received, each of the at least two digital broadcasting signals corresponding to one of the plurality of different broadcasting modes, the control unit is further configured to compare reception levels of the at least two digital broadcasting signals and set a reception mode to a broadcasting mode of one of the at least two digital broadcasting signals according to the result of the comparison.

It is contemplated that the control unit is further configured to determine the one of the at least two digital broadcasting signals having the highest reception level. It is further contemplated that the control unit is further configured to automatically set the reception mode.

It is contemplated that the first information stored in the memory includes at least one of terrestrial digital multimedia broadcasting, satellite digital multimedia broadcasting, media flow, and DVB-H digital broadcasting. It is further contemplated that the second information is received over at least one of a mobile network, a wireless Internet, and a broadcasting network. Preferably, the first information includes digital broadcasting service information and the second information includes a metadata interface.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
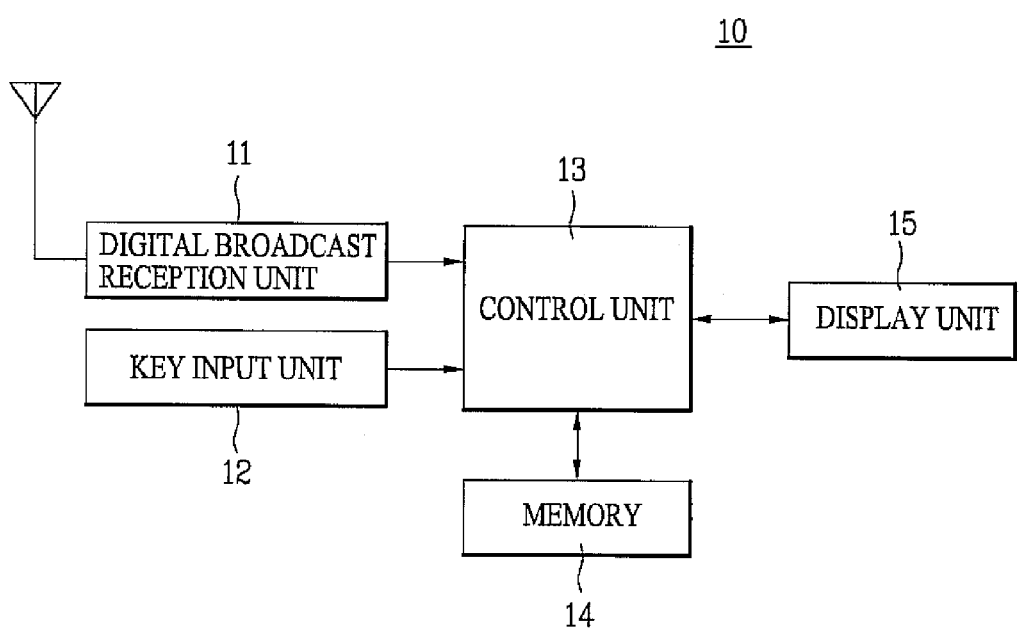
FIG. 1 is a schematic block diagram illustrating a configuration of a mobile terminal having a digital broadcast reception function according to the present invention.

FIG. 1 is a schematic block diagram illustrating a configuration of a mobile terminal 10 having a digital broadcast reception function according to the present invention. The mobile terminal 10 includes a digital broadcast reception unit 11 for receiving at least one digital broadcasting service information, a memory 14 for storing the digital broadcasting service information received by the digital broadcast reception unit and a metadata interface for mapping the digital broadcast service information according to its semantics, a control unit 13 for extracting the digital broadcasting service information from the memory using the metadata interface and generating a control signal for outputting the extracted result in a form that can be recognized by a user, a display unit 15 for displaying the extracted result according to the control signal of the control unit, and a key input unit 12 for entering a user input signal for using a digital broadcasting service that is sent to the control unit.

The digital broadcasting service information, for example, is indicative of broadcasting program schedule information. Service information having different structures can be used according to the type of the digital broadcasting service information without departing from the basic concept of the present invention.

A method of receiving and managing broadcasting program information and, specifically, an electronic program guide (EPG) will be described. The display unit 15 displays the EPG as a single table according to one embodiment of the present invention.

When the same contents of a broadcasting program that is currently being viewed can be received in a different broadcasting mode, the control unit 13 outputs a control signal for comparing reception levels of the broadcasting signals. The control unit 13 outputs a control signal for automatically switching the broadcasting mode to a different broadcasting mode when the reception level of the contents having the different broadcasting mode is higher than that of the broadcasting program that is currently being viewed.

The digital broadcasting service information stored in the memory 14 may be at least one of terrestrial digital multimedia broadcasting (TDMB), satellite digital multimedia broadcasting (SDMB), media flow and digital video broadcasting-handheld (DVB-H) digital broadcasting. The metadata interface information may be received over a mobile network, a broadcasting network or a wireless Internet.

Figure 2:
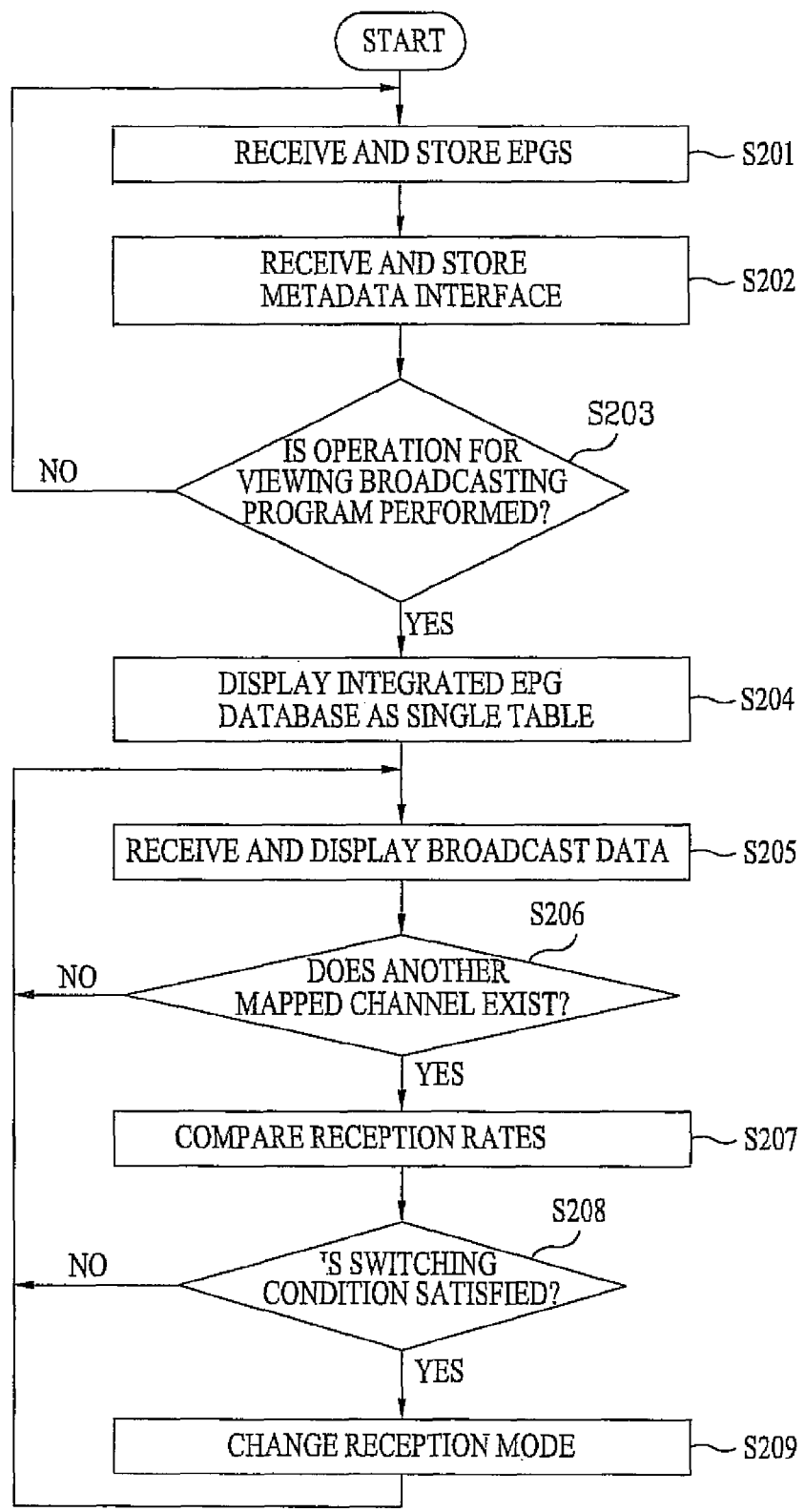
FIG. 2 is a flowchart illustrating a method of managing broadcasting service information according to the present invention.

FIG. 2 is a flowchart illustrating a method of managing broadcasting service information according to the present invention. An EPG structure and a transmission mode vary depending on a broadcasting mode and a broadcaster. The TDMB, the SDMB, the media flow, and the DVB-H digital broadcasting have EPGs with different structures, respectively. The EPGs with different structures are received and stored in the memory 14 as different databases (S201).

The metadata interface is received and stored in the memory 14 (S202). The metadata interface indicates data for mapping meta-structure information of the EPGs with different structures. The metadata interface may be received over the mobile network, the broadcasting network or the wireless Internet.

When the user performs an operation for viewing a digital broadcasting program using the key input unit 12 (S203), the control unit 13 displays an integrated EPG database as a single table using the metadata interface stored in the memory 14 (S204).

The user can utilize functions such as check, reservation and channel change of the program information having the different broadcasting modes using an EPG user interface. The EPG metadata interface and the EPG user interface are controlled by an operation of a digital broadcasting chip or a terminal control modem, such as a mobile station modem (MSM).

When the user utilizes a search function, items having the same semantics are extracted from the EPG databases stored in the memory 14 and displayed by the display unit 15. An interface provided by the broadcaster utilizes the EPG database in which data is separately stored according to the broadcasting mode. The broadcast data selected by the user is received and displayed by the display unit 15 (S205).

The EPG user interface is retrieved using the metadata interface. In this way, the same contents that are broadcast in at least two broadcasting modes at the same time can be retrieved from the EPG databases.

It is determined whether another channel exists to which the broadcasting program selected by the user is mapped (S206). This determination may be performed when the user selects or views the broadcasting program.

When another channel exists, to which the broadcast program selected by the user is mapped, the user interface selects the best broadcasting mode from the existing broadcasting modes. A screen is displayed indicating that the currently selected or viewed broadcasting program can be received via a broadcasting signal having a different broadcasting mode and the reception levels of the respective contents are compared when the user responds to the screen (S207). Alternatively the comparison may be automatically performed without informing the user.

If the reception level of the contents having the different broadcasting mode is better than that of the broadcasting program which is currently selected, a switching condition is satisfied (S208) and the reception mode is changed (S209). The user may be informed that the reception mode is changed.

Only the metadata interface and the user interface are changed if an additional broadcasting mode or broadcaster is added or the EPG structure is changed. Therefore, the EPG structure is easily changed. The EPG user interface may vary depending on the terminal since the EPG of the broadcaster is unrelated to the storage mode.

As described, a mobile terminal and method of managing broadcasting program information according to the present invention facilitates integrating, storing and searching digital broadcasting service information having a variety of structures without change. Therefore, it is possible to easily use broadcasting program schedule information having different structures as single information and to easily correspond to a new broadcasting environment standard.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, are not to limit the scope of the claims. Many alternatives, modifications, and variations will be apparent to those skilled in the art. In the claims, means-plus-function clauses are intended to cover the structure described herein as performing the related function and not only structural equivalents but also equivalent structures.

What is claimed is:

1. A method for managing digital broadcasting service information in a mobile terminal, the method comprising:
    receiving first program guide data from a first transmission system, the first program guide data being associated with received broadcast content;
    receiving second program guide data from a second transmission system, the second program guide data being associated with the received broadcast content, and wherein the first transmission system comprises a transmission mode which is different from a transmission mode of the second transmission system, and wherein the first program guide data is structured differently than a structure of the second program guide data;
    storing the first program guide data and the second program guide data in memory associated with the mobile terminal, wherein the storing of the first program guide data and the second program guide data occurs prior to receiving a user request for viewing a broadcast program;
    receiving, at the mobile terminal, the user request for viewing the broadcast program;
    generating, at the mobile terminal and in response to the receiving of the user request, a combined program guide comprising data from both the first program guide data and the second program guide data, wherein content of the combined program guide is determined at the mobile terminal according to a mapping indicated by meta-structured data stored in the memory, and wherein the generating of the combined program guide occurs after receiving of the user request;
    displaying the combined program guide on a display associated with the mobile terminal responsive to the user request received at the mobile terminal; and
    displaying the received broadcast content which is associated with the user requested broadcast program, wherein the displaying of the received broadcast content and the displaying of the combined program guide result from a single user request, which is the received user request for viewing the broadcast program.

2. The method according to claim 1, wherein each of the first program guide data and the second program guide data comprises an electronic program guide (EPG).

3. The method according to claim 1, wherein the displaying of the combined program guide comprises displaying a single virtual table.

4. The method according to claim 1, wherein the first program guide data and the second program guide data are each structured in accordance with one of terrestrial digital multimedia broadcasting, satellite digital multimedia broadcasting, media flow, or digital video broadcasting-handheld (DVB-H) digital broadcasting.

5. The method according to claim 1, further comprising:
receiving the meta-structured data via at least one of a mobile network, a wireless Internet, or a broadcasting network.

6. A mobile terminal, comprising:
a digital broadcast reception unit configured to receive first program guide data from a first transmission system, the first program guide data being associated with received broadcast content, the digital broadcast reception unit being further configured to receive second program guide data from a second transmission system, the second program guide data being associated with the received broadcast content, and wherein the first transmission system comprises a transmission mode which is different from a transmission mode of the second transmission system, and wherein the first program guide data is structured differently than a structure of the second program guide data;
memory configured to store the first program guide data and the second program guide data;
a control unit configured to:
cause storing of the first program guide data and the second program guide data in the memory prior to receiving a user request for viewing the broadcast program;
receive the user request for viewing the broadcast program;
generate, responsive to receiving the user request at the mobile terminal, a combined program guide comprising data from both the first program guide data and the second program guide data, wherein content of the combined program guide is determined at the mobile terminal according to a mapping indicated by meta-structured data stored in the memory, and wherein the generating of the combined program guide occurs after receiving of the user request;
cause the display unit to display on the display the received broadcast content which is associated with the user requested broadcast program, wherein the displaying of the received broadcast content and the displaying of the combined program guide result from a single user request, which is the received user request for viewing the broadcast program; and
a display unit configured to display the combined program guide on a display associated with the mobile terminal responsive to a user request received at the mobile terminal.

7. The mobile terminal according to claim 6, wherein each of the first program guide data and the second program guide data comprises an electronic program guide (EPG).

8. The mobile terminal according to claim 6, wherein the display unit is further configured to display the combined program guide as a single virtual table.

9. The mobile terminal according to claim 6, wherein the first program guide data and the second program guide data are each structured in accordance with one of terrestrial digital multimedia broadcasting, satellite digital multimedia broadcasting, media flow, or digital video broadcasting-handheld (DVB-H) digital broadcasting.

10. The mobile terminal according to claim 6, wherein the digital broadcast reception unit is further configured to receive the meta-structured data via at least one of a mobile network, a wireless Internet, or a broadcasting network.

* * * * *